United States Patent

Kidorf et al.

[11] Patent Number: 6,141,468
[45] Date of Patent: Oct. 31, 2000

[54] METHOD OF APPARATUS FOR REMOTELY PUMPING A RARE-EARTH DOPED OPTICAL FIBER AMPLIFIER AND A COMMUNICATION SYSTEM EMPLOYING SAME

[75] Inventors: Howard David Kidorf, Red Bank; Karsten Rottwitt, Basking Ridge, both of N.J.

[73] Assignee: Tyco Submarine Systems Ltd., Morristown, N.J.

[21] Appl. No.: 09/250,333

[22] Filed: Feb. 16, 1999

[51] Int. Cl.[7] ........................................... G02B 6/28
[52] U.S. Cl. ............................. 385/24; 359/334; 359/341
[58] Field of Search ............................... 385/24, 28, 27; 359/341, 334, 142

[56] References Cited

U.S. PATENT DOCUMENTS

| | | | |
|---|---|---|---|
| 4,790,619 | 12/1988 | Lines | 385/24 |
| 5,058,974 | 10/1991 | Mollenauer | 385/27 |
| 5,323,474 | 6/1994 | Hornung | 385/24 |
| 5,917,969 | 6/1999 | Gavrilovic | 385/15 |
| 6,081,366 | 6/2000 | Kidorf | 359/341 |

*Primary Examiner*—Cassandra Spyrou
*Assistant Examiner*—Leo Boutsikaris

[57] ABSTRACT

A method and apparatus is provided for providing pump energy to a doped optical fiber located along an optical transmission path. The doped optical fiber imparts amplification to an optical signal when pumped at a pump wavelength. In accordance with the method, pump energy is generated in the transmission fiber by introducing a power at a wavelength one Raman Stokes order below the desired pump wavelength. The pump energy is transmitted along the transmission path such that first order Raman Stokes-shifted light is applied to the doped optical fiber. For example, if the optical fiber is doped with erbium, which has a pump wavelength of about 1485 nm, pump energy is provided at a wavelength of 1390 nm.

13 Claims, 1 Drawing Sheet

METHOD OF APPARATUS FOR REMOTELY PUMPING A RARE-EARTH DOPED OPTICAL FIBER AMPLIFIER AND A COMMUNICATION SYSTEM EMPLOYING SAME

FIELD OF THE INVENTION

This invention relates to optical fiber communication systems, and more particularly to an optical fiber communication system that employs remote pumping of optical amplifiers.

BACKGROUND OF THE INVENTION

Commercial lightwave systems use optical fibers to carry large amounts of multiplexed digital data over long distances from a transmit terminal to a receive terminal. The maximum distance that the data can be transmitted in the fiber without amplification or regeneration is limited by the loss associated with the optical fiber (along with chromatic dispersion and optical nonlinearity). To transmit optical signals over long distances, lightwave systems may include a number of amplifiers located along the fiber route from the transmit terminal to the receive terminal. Each amplifier boosts the weak received signal to compensate for the transmission losses which occurred from the last amplifier. Optical amplifiers, such as rare earth doped optical fiber amplifiers, require a source of pump energy. In a rare earth doped optical fiber amplifier, for example, a dedicated pump laser is coupled to the doped fiber to excite the active medium (rare-earth element) within the amplifier. At the same time, a communication signal is passed through the doped fiber. The pumped fiber exhibits gain at the wavelength of the communication signal, providing the desired amplification.

The source of pump energy need not be co-located with the active medium because the transmission fiber is capable of carrying both the pump energy and the communication signal. In this case, the amplifier is said to be "remotely pumped."

A common active medium is an optical fiber doped with erbium ions. If the optical fiber is doped with erbium, for example, pump energy is provided at wavelengths of approximately 980 nm or 1485 nm, which coincides with absorption peaks of erbium. However, if energy is supplied by a pump laser operating at a wavelength of 1485 nm and remotely located from the doped fiber, spontaneously generated, Raman Stokes-shifted light is created in the transmission path and will deplete the pump energy available to pump the erbium-doped optical fiber. The diminished pump power limits the gain and output power of the remote amplifier and contributes to the noise of the amplifier. This limits the distance a signal can be transmitted and also limits the number of channels that may be employed in a wavelength division multiplexed transmission system.

It would therefore be desirable to reduce the pumping inefficiency caused by spontaneously generated Raman Stokes light.

SUMMARY OF THE INVENTION

The present invention provides a method and apparatus for providing pump energy to a remotely located, doped optical fiber located along an optical transmission path. The doped optical fiber imparts amplification to an optical signal when pumped at an appropriate pump wavelength. In accordance with the method, pump energy is provided at a wavelength one Raman Stokes order below the pump wavelength desired for the doped optical fiber. This pump energy is transmitted along the transmission path such that first order Raman Stokes light (i.e., Raman Stokes-shifted light) is generated as it travels toward the doped optical fiber. The first order Raman Stokes light is applied to the doped optical fiber and is of appropriate wavelength to cause gain. For example, if the optical fiber is doped with erbium which has an acceptable pump wavelength at about 1485 nm, pump energy is provided at a wavelength of about 1390 nm. The first order Raman Stokes light (i.e., Raman Stokes-shifted) is generated in the transmission fiber at a wavelength that peaks at about 1485 nm.

Without the use of the present invention, a high power pump for the doped fiber would be introduced in the transmission fiber. The present invention advantageously avoids the generation of unusable Raman Stokes light that would be generated. Another advantage of the present invention is that the amount of Raman gain generated at the signal wavelength would be reduced along with the attendant increase in noise.

DETAILED DESCRIPTION

Figure 1:
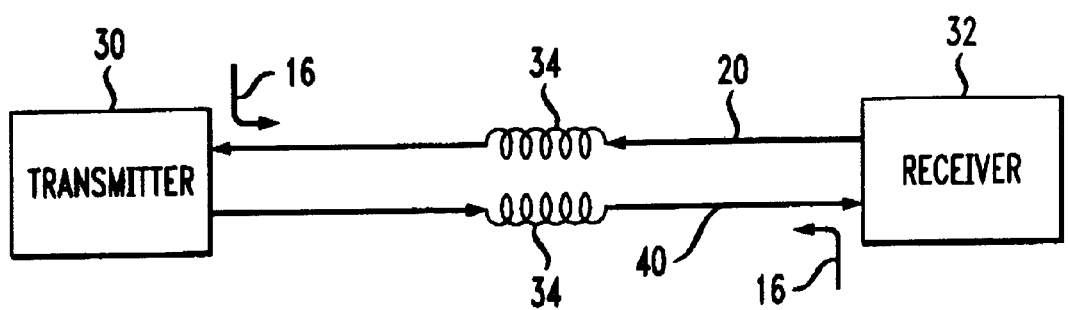
FIG. 1 shows a lightwave communication system constructed in accordance with the present invention.

Referring to FIG. 1, there is disclosed a repeaterless lightwave communication system in which a remotely pumped rare-earth doped optical fiber is employed. The system includes transmitter/receiver terminals 30 and 32 and optical transmission fiber paths 20 and 40 supporting bi-directional communication. Doped optical fibers 34 are interposed in the fiber paths 20 and 40 between the transmitter/receiver terminals 30 and 32. Each doped optical fiber 34 serves as an optical amplifier when properly coupled to a source of optical pump energy such as remotely located pump sources 16. The signals being transmitted from the terminals 30 and 32 are in optical form. There is no intermediate conversion to electrical form. While only two sets of pumps, couplers and doped optical fibers are depicted in FIG. 1 for clarity of discussion, it should be understood by those skilled in the art that the present invention finds application in transmission paths of all lengths having many additional sets of such components. Various arrangements provide for repeatered systems (where the pump sources are located in isolated repeaters) as well as single span, remotely pumped systems (where the pump sources are co-located with the transmitter/receiver terminals), for pump redundancy and for counter-propagating as well as copropagating pump signals. Choice among these variations will depend on system design and amplifier design.

In existing systems, the pump energy from pump source 16 is provided at a wavelength which will pump the doped optical fibers 34 that are provided along the fiber paths 20 and 40. For example, if the doped optical fibers are doped with erbium, pump source 16 will output pump energy at a wavelength of about 1485 nm. The suitably pumped erbium doped fibers will amplify signals from wavelengths of about 1530–1560 nm.

One problem that arises when pump energy is supplied at 1485 nm is that the pump energy generates light in the transmission path from 1580 to 1590 nm due to spontaneously generated Raman Stokes light. The light at 1580 to 1590 nm is referred to as the first order Raman Stokes. The generation of Raman Stokes light at 1580 to 1590 nm results in depletion of the 1485 nm pump thus reducing the pumping efficiency of the arrangement. Additionally, the generation of Raman Stokes light at wavelengths occupied by signals contributes greatly to the noise level associated with the signals. The present invention avoids this inefficiency and noise by taking advantage of the Raman Stokes-shifted light.

In accordance with the present invention, optical energy is provided at a wavelength one Raman Stokes order below the wavelength that is required to pump the doped fiber. The pump source 16 thus causes first order Raman Stokes light at the pump wavelength to be generated within transmission fibers 20 and 40. The first order Raman Stokes light is directed to the doped fiber and serves as the pump energy. For example, if the wavelength of the required pump energy is about 1485 nm, optical energy is provided at a wavelength of 1390 nm, which is one Raman Stokes order below 1485 nm. As a result, instead of generating unused Raman Stokes light that leads to pump depletion, the present invention shifts the energy provided by the pump source so that the Raman Stokes light itself serves as the pump energy.

Of course, those of ordinary skill in the art will recognize that the present invention is applicable to dopants other than erbium, which may have different absorption peaks. For example, if the dopant is Nd, pump energy should be provided at a wavelength of about 1300 nm. In this case pump energy should be provided at a wavelength one Raman Stokes order below 1300 nm, or 1225 nm.

Another advantage of the present invention is that the amount of Raman gain generated at the signal wavelength of 1550 nm can be reduced. This gain is spectrally unequalized and should therefore be avoided. Moreover, if the spontaneously generated Raman Stokes light at 1485 nm should begin to lase or significantly deplete the pump source operating at 1390 nm, system performance will not be limited as a result. In fact, it might be advantageous since additional power at 1485 nm will be available.

The doped optical fibers 34 illustratively disclosed in FIG. I can be rare earth doped optical fibers where the doping material can be, for example, erbium. The rare earth doped optical fiber, which can have a length of, for example, 10 to 200 meters, is coupled end-to-end within the transmission fiber path. The rare earth doped fibers 34 can be coupled to the optical fiber transmission path via core-to-core splices. The directional couplers 12 are designed to have a high coupling ratio at the pump wavelength and a low coupling ratio at the signal wavelength.

As previously mentioned, the present invention may be advantageously employed in a variety of differently configured optical transmission systems. The invention is particularly advantageous in repeaterless wavelength division multiplexed (WDM) systems, however, since the increased availability of pump power allows more WDM channels to be employed and the overall transmission distance to be increased.

What is claimed is:

1. A method of providing pump energy to a doped optical fiber located along an optical transmission path, said doped optical fiber imparting amplification to an optical signal when pumped at a pump wavelength, said method comprising the steps of:

generating pump energy at a wavelength one Raman Stokes order below said pump wavelength;

transmitting said pump energy along said transmission path such that first order Raman Stokes light is applied to said doped optical fiber.

2. The method of claim 1 wherein said doped optical fiber is a rare-earth doped optical fiber.

3. The method of claim 2 wherein said rare-earth doped optical fiber is doped with erbium.

4. The method of claim 3 wherein said pump energy corresponds to a wavelength of about 1390 nm and said pump wavelength is about 1485 nm.

5. The method of claim 1 further comprising the step of transmitting a wavelength division multiplexed (WDM) signal along the transmission path.

6. A lightwave communication system, comprising:

first and second optical transmitters/receivers remotely located with respect to one another;

first and second optical transmission paths coupling said first transmitter/receiver to said second transmitter/receiver for bidirectionally transmitting optical information therebetween;

first and second doped optical fibers respectively disposed in said first and second optical transmission paths, said first and second doped optical fibers imparting amplification to an optical signal when pumped at a pump wavelength;

first and second optical pump sources for supplying optical pump energy, said first and second optical pump sources generating pump energy at a wavelength one Raman Stokes order below said pump wavelength;

first and second optical couplers for optically coupling said pump energy from said first and second pump sources to said first and second optical transmission paths, respectively.

7. The system of claim 6 wherein said first and second optical pump sources provide optical pump energy that propagates contra-directionally with respect to optical information signals.

8. The system of claim 6 wherein said first optical pump source generates optical pump energy that propagates co-directionally with respect to optical information signals.

9. The system of claim 6 wherein said doped optical fibers are rare-earth doped optical fibers.

10. The system of claim 9 wherein said rare-earth doped optical fibers are doped with erbium.

11. The system of claim 10 wherein said pump energy corresponds to a wavelength of about 1390 nm and said pump wavelength is about 1485 nm.

12. The system of claim 6 wherein said first and second optical couplers are directional couplers having a high coupling ratio at a wavelength corresponding to said pump energy and a low coupling ratio at the optical signal wavelength.

13. The system of claim 1 wherein said first and second optical transmitters/receivers transmit and receive WDM channels.

* * * * *